US008838630B2

(12) United States Patent
Bots et al.

(10) Patent No.: US 8,838,630 B2
(45) Date of Patent: *Sep. 16, 2014

(54) METHOD AND SYSTEMS FOR EFFICIENT DELIVERY OF PREVIOUSLY STORED CONTENT

(75) Inventors: Henk Bots, Santa Clara, CA (US); Srikanth Devarajan, Santa Clara, CA (US); Saravana Annamalaisami, Santa Clara, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 17 days.

This patent is subject to a terminal disclaimer.

(21) Appl. No.: 12/790,400

(22) Filed: May 28, 2010

(65) Prior Publication Data

US 2010/0235374 A1 Sep. 16, 2010

Related U.S. Application Data

(63) Continuation of application No. 11/428,058, filed on Jun. 30, 2006, now Pat. No. 7,756,826.

(51) Int. Cl.

*G06F 17/30* (2006.01)
*H04L 29/08* (2006.01)
*G06F 17/22* (2006.01)

(52) U.S. Cl.

CPC ......... *H04L 67/06* (2013.01); *Y10S 707/99956* (2013.01); *Y10S 707/99955* (2013.01); *Y10S 707/99948* (2013.01); *G06F 17/2211* (2013.01); *H04L 67/1097* (2013.01)

USPC .... 707/758; 707/625; 707/681; 707/999.205; 707/999.204; 707/999.107

(58) Field of Classification Search

CPC . G06F 8/68; G06F 17/30067; G06F 11/1402; G06F 11/1451; G06F 17/2211; G06F 17/3015; G06F 2212/1044; G06F 17/30174

USPC ......... 707/1, 3, 100, 200, 204, 205, 610, 624, 707/625, 643, 758

See application file for complete search history.

(56) References Cited

U.S. PATENT DOCUMENTS 5,905,492 A 5/1999 Straub et al.
6,022,315 A 2/2000 Iliff (Continued)

FOREIGN PATENT DOCUMENTS

WO WO-0239261 A2 5/2002
WO WO-0239264 A2 5/2002

(Continued)

OTHER PUBLICATIONS

International Preliminary Report on Patentability for PCT/US2007/072490, mailed on Jan. 15, 2009, 8 pages.

(Continued)

*Primary Examiner* — Fred I Ehichioya
*Assistant Examiner* — Dangelino Gortayo
(74) *Attorney, Agent, or Firm* — Foley & Lardner LLP; Christopher J. McKenna

(57) ABSTRACT

Systems and methods for reducing file sizes for files delivered over a network are disclosed. A method comprises receiving a first file comprising sequences of data; creating a hash table having entries corresponding to overlapping sequences of data; receiving a second file comprising sequences of data; comparing each of the sequences of data in the second file to the sequences of data in the hash table to determine sequences of data present in both the first and second files; and creating a third file comprising sequences of data from the second file and representations of locations and lengths of said sequences of data present in both the first and second files.

16 Claims, 8 Drawing Sheets

(56) References Cited

U.S. PATENT DOCUMENTS 6,130,726 A 10/2000 Darbee et al.
6,206,829 B1 3/2001 Iliff
6,289,382 B1 9/2001 Bowman-Amuah
6,292,792 B1 9/2001 Baffes et al.
6,314,094 B1 11/2001 Boys
6,332,163 B1 12/2001 Bowman-Amuah
6,339,832 B1 1/2002 Bowman-Amuah
6,424,979 B1 7/2002 Livingston et al.
6,434,568 B1 8/2002 Bowman-Amuah
6,434,628 B1 8/2002 Bowman-Amuah
6,438,594 B1 8/2002 Bowman-Amuah
6,442,748 B1 8/2002 Bowman-Amuah
6,449,627 B1 9/2002 Baer et al.
6,473,794 B1 10/2002 Guheen et al.
6,477,580 B1 11/2002 Bowman-Amuah
6,477,665 B1 11/2002 Bowman-Amuah
6,482,156 B2 11/2002 Iliff
6,496,850 B1 12/2002 Bowman-Amuah
6,502,213 B1 12/2002 Bowman-Amuah
6,519,571 B1 2/2003 Guheen et al.
6,529,909 B1 3/2003 Bowman-Amuah
6,529,948 B1 3/2003 Bowman-Amuah
6,536,037 B1 3/2003 Barrese et al.
6,539,396 B1 3/2003 Bowman-Amuah
6,549,949 B1 4/2003 Bowman-Amuah
6,550,012 B1 4/2003 Villa et al.
6,550,057 B1 4/2003 Bowman-Amuah
6,571,282 B1 5/2003 Bowman-Amuah
6,578,068 B1 6/2003 Bowman-Amuah
6,584,569 B2 6/2003 Reshef et al.
6,591,266 B1 7/2003 Li et al.
6,601,192 B1 7/2003 Bowman-Amuah
6,601,234 B1 7/2003 Bowman-Amuah
6,606,660 B1 8/2003 Bowman-Amuah
6,611,840 B1 8/2003 Baer et al.
6,615,166 B1 9/2003 Guheen et al.
6,615,199 B1 9/2003 Bowman-Amuah
6,615,253 B1 9/2003 Bowman-Amuah
6,636,242 B2 10/2003 Bowman-Amuah
6,640,238 B1 10/2003 Bowman-Amuah
6,640,244 B1 10/2003 Bowman-Amuah
6,640,249 B1 10/2003 Bowman-Amuah
6,658,464 B2 12/2003 Reisman
6,691,301 B2 2/2004 Bowen
6,704,738 B1 3/2004 de Vries et al.
6,715,145 B1 3/2004 Bowman-Amuah
6,721,713 B1 4/2004 Guheen et al.
6,742,015 B1 5/2004 Bowman-Amuah
6,754,699 B2 6/2004 Swildens et al.
6,792,458 B1 9/2004 Muret et al.
6,804,701 B2 10/2004 Muret et al.
6,816,872 B1 11/2004 Squibb
6,839,701 B1 1/2005 Baer et al.
6,842,906 B1 1/2005 Bowman-Amuah
6,847,983 B2 1/2005 Somalwar et al.
6,849,045 B2 2/2005 Iliff
6,868,292 B2 3/2005 Ficco et al.
6,895,084 B1 5/2005 Saylor et al.
6,925,467 B2 8/2005 Gu et al.
6,957,186 B1 10/2005 Guheen et al.
6,963,981 B1 11/2005 Bailey et al.
6,976,090 B2 12/2005 Ben-Shaul et al.
6,981,180 B1 12/2005 Bailey et al.
6,986,102 B1 1/2006 Baer et al.
6,993,004 B2 1/2006 Boys
7,007,034 B1 2/2006 Hartman, Jr. et al.
7,007,064 B2 2/2006 Faris
7,043,488 B1 5/2006 Baer et al.
7,047,281 B1 * 5/2006 Kausik .......................... 709/213
7,054,912 B2 5/2006 Kanai et al.
7,076,486 B2 * 7/2006 Livshits ................ 707/999.003
7,076,494 B1 7/2006 Baer et al.
7,080,041 B2 7/2006 Nagel
7,089,239 B1 8/2006 Baer et al.
7,149,698 B2 12/2006 Guheen et al.
7,152,047 B1 12/2006 Nagel
7,165,041 B1 1/2007 Guheen et al.
7,188,216 B1 3/2007 Rajkumar et al.
7,222,137 B2 5/2007 Terazono et al.
7,320,009 B1 * 1/2008 Srivastava et al. ............ 707/625
7,353,225 B2 4/2008 Dada
7,359,956 B2 4/2008 Kanai et al.
7,360,025 B1 4/2008 O'Connell et al.
7,366,824 B2 * 4/2008 Chiang ......................... 711/100
7,392,260 B2 * 6/2008 Ren et al. ...................... 707/752
7,529,779 B2 * 5/2009 Herle et al. ............ 707/999.005
7,698,318 B2 * 4/2010 Fries et al. .................... 707/610
7,711,706 B2 * 5/2010 Manapetty et al. ........... 707/621
7,730,031 B2 * 6/2010 Forster .......................... 707/625
7,743,063 B2 * 6/2010 James et al. .................. 707/752
7,890,464 B2 * 2/2011 Reinsch ........................ 707/638
7,941,410 B2 * 5/2011 Sagar et al. ................... 707/691
7,970,806 B2 * 6/2011 Park et al. ..................... 707/824
8,156,071 B2 * 4/2012 Gu et al. ......................... 341/50
2001/0019630 A1 9/2001 Johnson
2002/0042821 A1 4/2002 Muret et al.
2002/0049608 A1 4/2002 Hartsell et al.
2002/0049841 A1 4/2002 Johnson et al.
2002/0059274 A1 5/2002 Hartsell et al.
2002/0065864 A1 5/2002 Hartsell et al.
2002/0143798 A1 10/2002 Lisiecki et al.
2002/0143888 A1 10/2002 Lisiecki et al.
2002/0147774 A1 10/2002 Lisiecki et al.
2002/0174227 A1 11/2002 Hartsell et al.
2003/0065763 A1 4/2003 Swildens et al.
2003/0069803 A1 4/2003 Pollitt
2004/0006643 A1 1/2004 Dolson et al.
2004/0010621 A1 1/2004 Afergan et al.
2004/0031058 A1 2/2004 Reisman
2004/0073701 A1 4/2004 Huang et al.
2005/0004954 A1 * 1/2005 Soule, III ...................... 707/203
2005/0033858 A1 2/2005 Swildens et al.
2005/0044089 A1 2/2005 Wu et al.
2005/0050053 A1 3/2005 Thompson
2005/0165889 A1 7/2005 Muret et al.
2006/0069926 A1 3/2006 Ginter et al.
2006/0106888 A1 5/2006 Iida et al.
2006/0130046 A1 6/2006 O'Neill
2006/0271705 A1 11/2006 Garcia-Luna-Aceves
2007/0106681 A1 5/2007 Haot et al.
2007/0245409 A1 10/2007 Harris et al.

FOREIGN PATENT DOCUMENTS

WO WO-0239275 A2 5/2002
WO WO-0239666 A2 5/2002
WO WO-0239693 A2 5/2002
WO WO-0239695 A2 5/2002
WO WO-0241575 A2 5/2002
WO WO-0243364 A2 5/2002
WO WO-2005029313 A1 3/2005
WO WO-2005029363 A1 3/2005
WO WO-2006061843 A2 6/2006

OTHER PUBLICATIONS

International Search Report for PCT Application No. PCT/US2007/072490. Date of mailing: Mar. 12, 2008. 5 pages.
Written Opinion of the International Searching Authority for PCT Application No. PCT/US2007/072490. Date of mailing: Mar. 12, 2008. 8 pages.
International Preliminary Report on Patentability for PCT/US2007/072490, dated Jan. 6, 2009, 8 pages.
Chinese Office Action on 200780024871.5 dated Nov. 23, 2011.
European Office Action issued on Dec. 21, 2012 in European Patent Application No. 07812481.5.

* cited by examiner

METHOD AND SYSTEMS FOR EFFICIENT DELIVERY OF PREVIOUSLY STORED CONTENT

RELATED APPLICATIONS

This present application claims priority to and is a continuation of U.S. Non-Provisional application Ser. No. 11/428,058, entitled “Method and Systems for Efficient Delivery of Previously Stored Content”, filed on Jun. 30, 2006, which is incorporated herein by reference in its entirety.

FIELD OF THE INVENTION

The present invention is directed to Internet and computer network content delivery and, more particularly, to systems and methods for reducing file sizes for files delivered over a network.

BACKGROUND OF THE INVENTION

In many network environments, bandwidth is a scarce resource. Bandwidth may be limited by the connection infrastructure of the environment or the maximum transmission or reception speeds of devices on the network. Where bandwidth is scarce, significant improvements in transmission time can be achieved by reducing the size of files transmitted over a network.

Another common feature of networks, including the internet and the World Wide Web, is the transmission of redundant data. For example, often a client may request the same file on different days to observe any changes that have taken place. A large portion of the file data may be redundant in that it has already been transmitted to the user. For example, if the file is the web page of a newspaper, the headings and formatting information will remain constant. As another example, a client may load a file several times within a single hour, for example if the file is a web page listing updated sports scores. In this example, the only data that changes from viewing to viewing may be the scores themselves, and the team names, logos, and formatting will remain unchanged.

Several systems and methods already exist for taking advantage of this redundancy to reduce the size of transmitted files. Many web browsers store images from sites a user has already visited so that they do not need to be retransmitted if the user returns to the site. While this method is effective, it is typically limited only to standard image files, and cannot reduce file sizes for pages comprising large amounts of text, scripts, or formatting information. Many web sites utilize frames, applets, or scripts to control web pages so that only the portion of a page that has changed will be retransmitted. The drawback of this approach is that programming a site to use these techniques often requires substantial developer time and resources, and may require recoding previously existing files. Thus there exists a need for means to leverage the redundancy found in many network transmissions to reduce the size of transmitted files that may be easily applied to both presently existing and future files.

SUMMARY OF THE INVENTION

The present invention provides an efficient mechanism by which the transmitted file sizes can be significantly reduced for files comprising data that has previously been transmitted. The invention may make this reduction possible without the need for file specific, application specific, or network specific solutions, and thus may not require substantial developer investment.

In one aspect, the invention is a method for creating efficient updates to a previously stored file. The method comprises receiving a first file comprising sequences of data; creating a hash table having entries corresponding to overlapping sequences of data; receiving a second file comprising sequences of data; comparing each of the sequences of data in the second file to the sequences of data in the hash table to determine sequences of data present in both the first and second files; storing representations of lengths and locations of said sequences of data present in both the first and second files; and creating a third file comprising sequences of data from the second file and representations of locations and lengths of said sequences of data present in both the first and second files.

In another aspect, the invention is a method of receiving efficient updates to previously stored files. The method comprises receiving a first file comprising sequences of data, receiving a second file comprising sequences of data and representations of locations and lengths of sequences in the first file, and executing a Javascript function to create a third file comprising sequences of data from the second file and sequences in the first file indicated by the second file.

In yet another aspect, the invention is a computer system for creating efficient updates to a previously stored file. The system comprises a transceiver which receives a first and second file, each file comprising a respective plurality of sequences of data; a hash engine which communicates with said transceiver and computes hash values for sequences of data in the first and second file, wherein at least two of said sequences overlap, and determines sequences of data present in both the first and second files; a storage element in communication with said hash engine which stores representations of the lengths and locations of said sequences present in both the first and second files; and a processor in communication with said storage element which creates a third file comprising sequences of data from the second file and representations of lengths and locations of said sequences present in both files.

BRIEF DESCRIPTION OF THE DRAWINGS

The foregoing and other objects, aspects, features, and advantages of the invention will become more apparent and may be better understood by referring to the following description taken in conjunction with the accompanying drawings, in which.

DETAILED DESCRIPTION OF THE INVENTION

Servers and clients as described herein may comprise any device capable of processing information and sending and receiving information, including without limitation a personal computer, notebook computer, personal digital assistant, cellular telephone, pager, a standalone computer server, a blade server, a rack mounted server, or a group of any types of said servers.

Figure 1A:
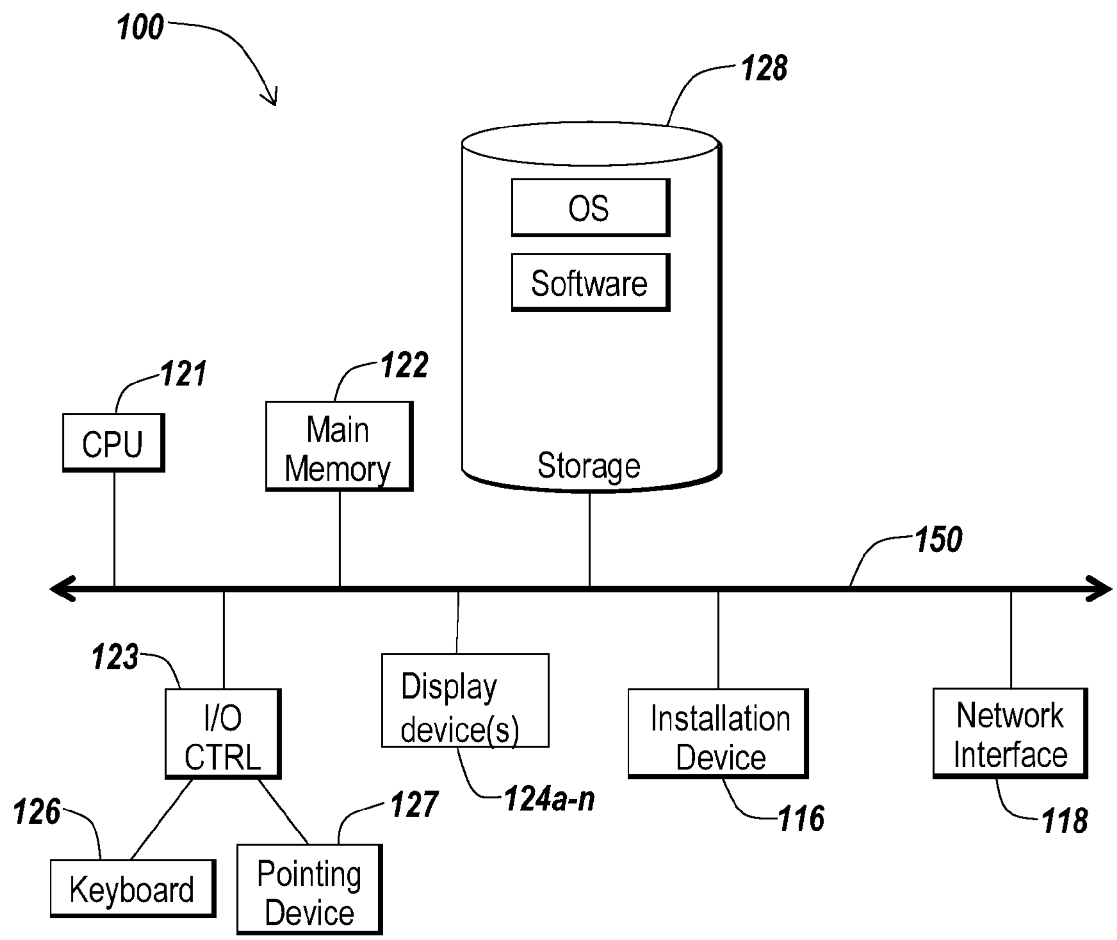
FIGS. 1A and 1B are block diagrams of embodiments of a computing or network device useful as a device in a client-server network.
Figure 1B:
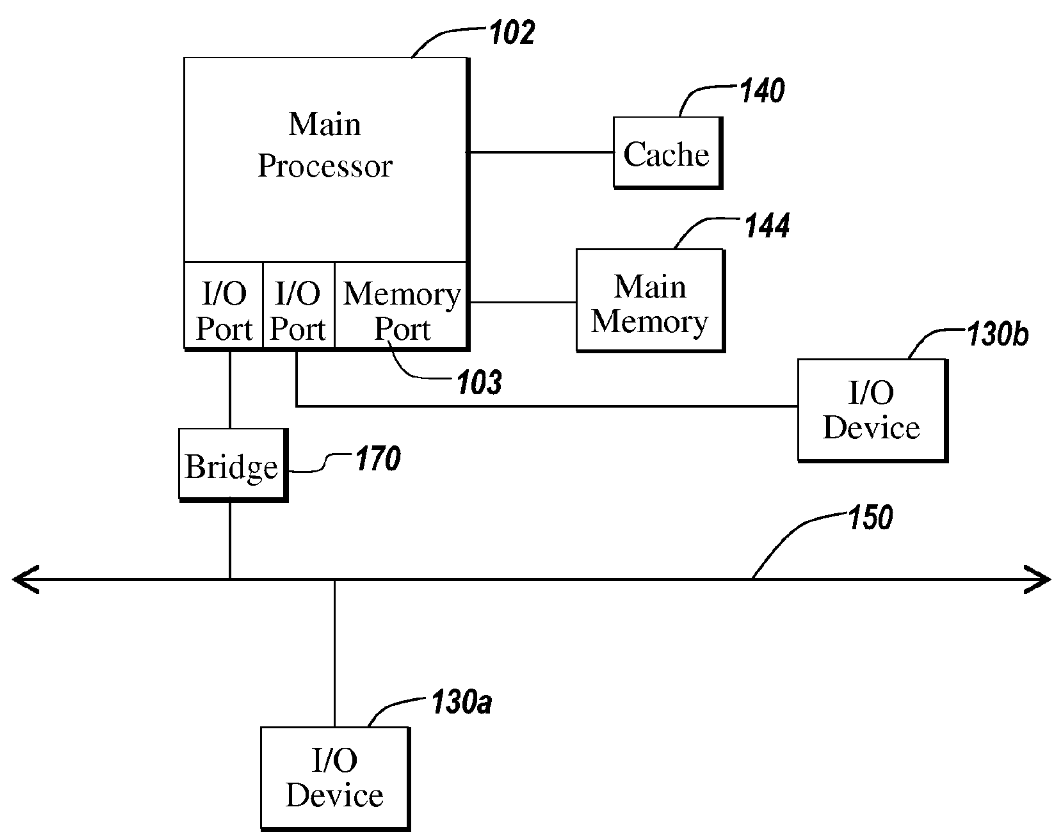

FIGS. 1A and 1B depict block diagrams of a typical computer 100 useful as client computing devices and server computing devices. As shown in FIGS. 1A and 1B, each computer 100 includes a central processing unit 102, and a main memory unit 104. Each computer 100 may also include other optional elements, such as one or more input/output devices 130*a*-130-*b* (generally referred to using reference numeral 130), and a cache memory 140 in communication with the central processing unit 102.

The central processing unit 102 is any logic circuitry that responds to and processes instructions fetched from the main memory unit 104. In many embodiments, the central processing unit is provided by a microprocessor unit, such as those manufactured by Intel Corporation of Mountain View, Calif.; those manufactured by Motorola Corporation of Schaumburg, Ill.; the Crusoe and Efficeon lines of processors manufactured by Transmeta Corporation of Santa Clara, Calif.; the lines of processors manufactured by International Business Machines of White Plains, N.Y.; or the lines of processors manufactured by Advanced Micro Devices of Sunnyvale, Calif.

Main memory unit 104 may be one or more memory chips capable of storing data and allowing any storage location to be directly accessed by the microprocessor 102, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). In the embodiment shown in FIG. 1A, the processor 102 communicates with main memory 104 via a system bus 150 (described in more detail below). FIG. 1B depicts an embodiment of a computer system 100 in which the processor communicates directly with main memory 104 via a memory port. For example, in FIG. 1B the main memory 104 may be DRDRAM.

FIGS. 1A and 1B depict embodiments in which the main processor 102 communicates directly with cache memory 140 via a secondary bus, sometimes referred to as a "backside" bus. In other embodiments, the main processor 102 communicates with cache memory 140 using the system bus 150. Cache memory 140 typically has a faster response time than main memory 104 and is typically provided by SRAM, BSRAM, or EDRAM.

In the embodiment shown in FIG. 1A, the processor 102 communicates with various I/O devices 130 via a local system bus 150. Various busses may be used to connect the central processing unit 102 to the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is an video display, the processor 102 may use an Advanced Graphics Port (AGP) to communicate with the display. FIG. 1B depicts an embodiment of a computer system 100 in which the main processor 102 communicates directly with I/O device 130*b* via HyperTransport, Rapid I/O, or InfiniBand. FIG. 1B also depicts an embodiment in which local busses and direct communication are mixed: the processor 102 communicates with I/O device 130*a* using a local interconnect bus while communicating with I/O device 130*b* directly.

A wide variety of I/O devices 130 may be present in the computer system 100. Input devices include keyboards, mice, trackpads, trackballs, microphones, and drawing tablets. Output devices include video displays, speakers, inkjet printers, laser printers, and dye-sublimation printers. An I/O device may also provide mass storage for the computer system 800 such as a hard disk drive, a floppy disk drive for receiving floppy disks such as 3.5-inch, 5.25-inch disks or ZIP disks, a CD-ROM drive, a CD-R/RW drive, a DVD-ROM drive, tape drives of various formats, and USB storage devices such as the USB Flash Drive line of devices manufactured by Twintech Industry, Inc. of Los Alamitos, Calif.

In further embodiments, an I/O device 130 may be a bridge between the system bus 150 and an external communication bus, such as a USB bus, an Apple Desktop Bus, an RS-132 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

General-purpose computers of the sort depicted in FIG. 1A and FIG. 1B typically operate under the control of operating systems, which control scheduling of tasks and access to system resources. Typical operating systems include: MICROSOFT WINDOWS, manufactured by Microsoft Corp. of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, among others.

For embodiments comprising mobile devices, the device may be a JAVA-enabled cellular telephone, such as the i55sr, i58sr, i85s, or the i88s, all of which are manufactured by Motorola Corp. of Schaumburg, Ill.; the 6035 or the 7135, manufactured by Kyocera of Kyoto, Japan; or the i300 or i330, manufactured by Samsung Electronics Co., Ltd., of Seoul, Korea. In other embodiments comprising mobile devices, a mobile device may be a personal digital assistant (PDA) operating under control of the PalmOS operating system, such as the Tungsten W, the VII, the VIIx, the i705, all of which are manufactured by palmOne, Inc. of Milpitas, Calif. In further embodiments, the client 113 may be a personal digital assistant (PDA) operating under control of the PocketPC operating system, such as the iPAQ 4155, iPAQ 5555, iPAQ 1945, iPAQ 2215, and iPAQ 4255, all of which manufactured by Hewlett-Packard Corporation of Palo Alto, Calif.; the ViewSonic V36, manufactured by ViewSonic of Walnut, Calif.; or the Toshiba PocketPC e405, manufactured by Toshiba America, Inc. of New York, N.Y. In still other embodiments, the mobile device is a combination PDA/telephone device such as the Treo 180, Treo 270, Treo 600, Treo 650, Treo 700, or the Treo 700w, all of which are manufactured by palmOne, Inc. of Milpitas, Calif. In still further embodiments, the mobile device is a cellular telephone that operates under control of the PocketPC operating system, such as the MPx200, manufactured by Motorola Corp. A typical mobile device may comprise many of the elements described above in FIGS. 1A and 1B, including the processor 102 and the main memory 104.

Figure 2:
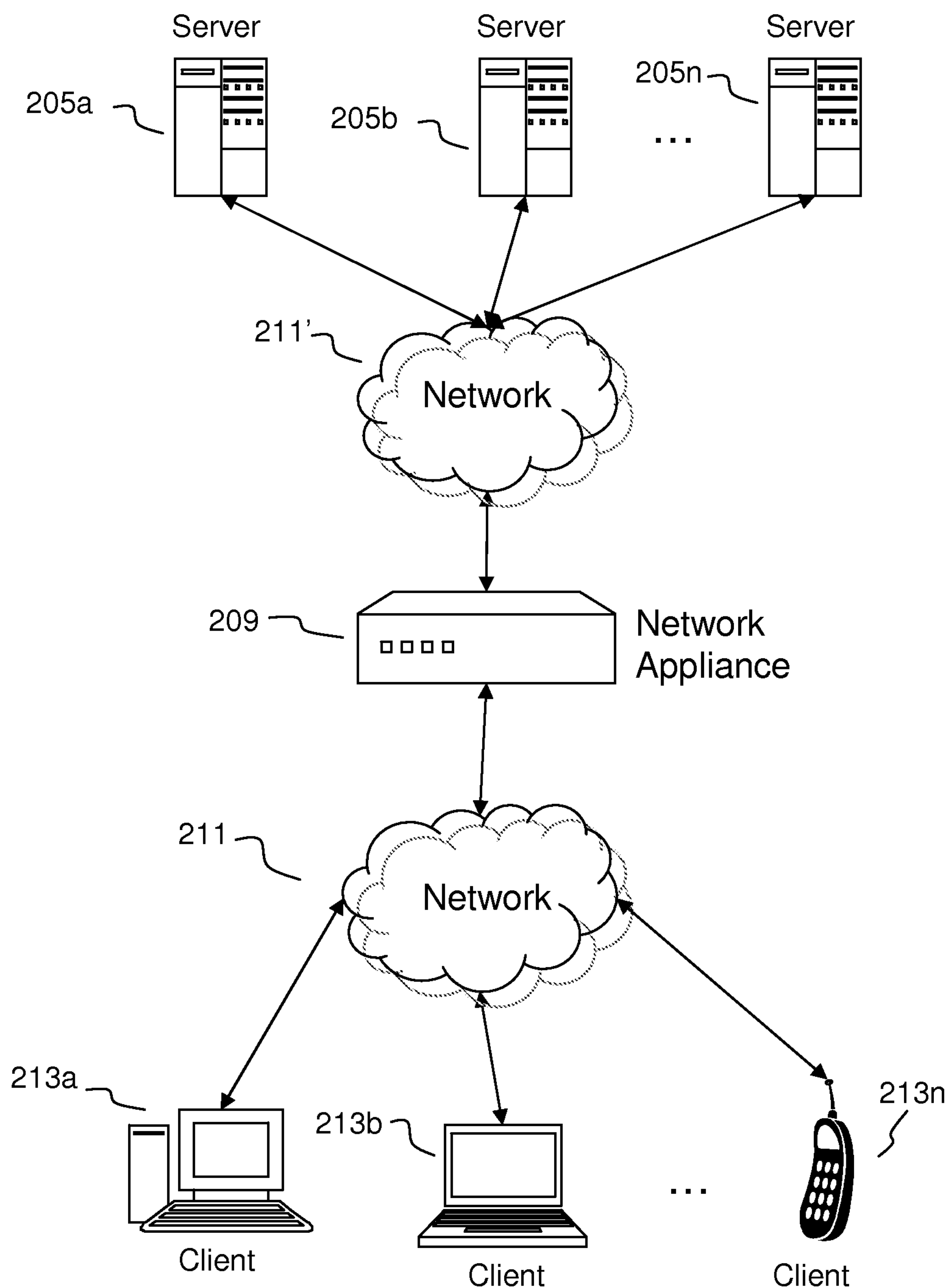
FIG. 2 is a block diagram illustrating an embodiment of a network appliance operating in a client-server network.

FIG. 2 depicts a block diagram illustrating an embodiment of a network appliance operating in a client-server network. In brief overview, a number of clients 213*a*, 213*b*, . . . 213*n*' (collectively referred to as 213), are connected via a network 211, to a network appliance, 209, which in turn is connected to a network 211' comprising a number of servers 205*a*, 205*b*, 205*n* (collectively referred to as 205). The clients 213, networks 211, servers 205, and network appliance 209 may comprise any computing devices comprising substantially similar capabilities, descriptions, functions, and configurations as described herein.

Still referring to FIG. 2, in greater detail, a network appliance 209 connected via a network 211' to a number of servers 205 is shown. In the embodiment shown, the servers 205 may comprise any device capable of processing information and sending and receiving information, including a standalone computer server, a blade server, a rack mounted server, or a group of any types of said servers. The servers may further comprise databases, file servers, web servers, application servers or any other type of server. In embodiments involving multiple servers, the servers may be identical servers, or may differ in make, model, type, content, performance, availability, or any other aspect.

The network appliance 209 may perform any function related to providing services to clients 213 including, without limitation, firewall services, SSL pooling and acceleration, TCP pooling and acceleration, data compression, connection monitoring, application logging, application acceleration, application delivery, load balancing, caching, virtualization, translation, redirection, connection pooling, proxy services, reverse proxy services, authentication, and session management. In some embodiments, the network appliance 209 may reside on the same physical machine as the servers 205. In some embodiments, the network appliance 209 may share processors, disk space, RAM, or any other computing resource with the servers 205.

In the embodiment shown, the network appliance 209 is connected to networks 211, 211'. The networks 211, 211' may comprise the Internet, local networks, web servers, file servers, routers, databases, computers, servers, network appliances, or any other computing devices capable of sending and receiving information. The networks 211, 211' may comprise computing devices connected via cables, IR ports, wireless signals, or any other means of connecting multiple computing devices. The networks 211, 211' and any devices connected to the networks may communicate via any communication protocol used to communicate among or within computing devices, including without limitation SSL, HTML, XML, RDP, ICA, FTP, HTTP, TCP, IP, UDP, IPX, SPX, NetBIOS, NetBEUI, SMB, SMTP, Ethernet, ARCNET, Fiber Distributed Data Interface (FDDI), RS232, IEEE 802.11, IEEE 802.11a, IEE 802.11b, IEEE 802.11g and direct asynchronous connections, or any combination thereof. The networks 211, 211' may comprise mobile telephone networks utilizing any protocol or protocols used to communicate among mobile devices, including AMPS, TDMA, CDMA, GSM, GPRS or UMTS. The networks 211, 211' may comprise physically distinct networks, or the networks 211, 211' may comprise the same network, and may be connected in any manner. In some embodiments, the devices communicating via network 211' may use a specialized or different protocol than devices communicating via network 211.

In embodiments comprising a TCP/IP based communications among any of the above devices, any TCP/IP based protocol may be used, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. Any type and form of transport control protocol may also be used, such as a modified transport control protocol, for example a Transaction TCP (T/TCP), TCP with selection acknowledgements (TCPSACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used.

Figure 3:
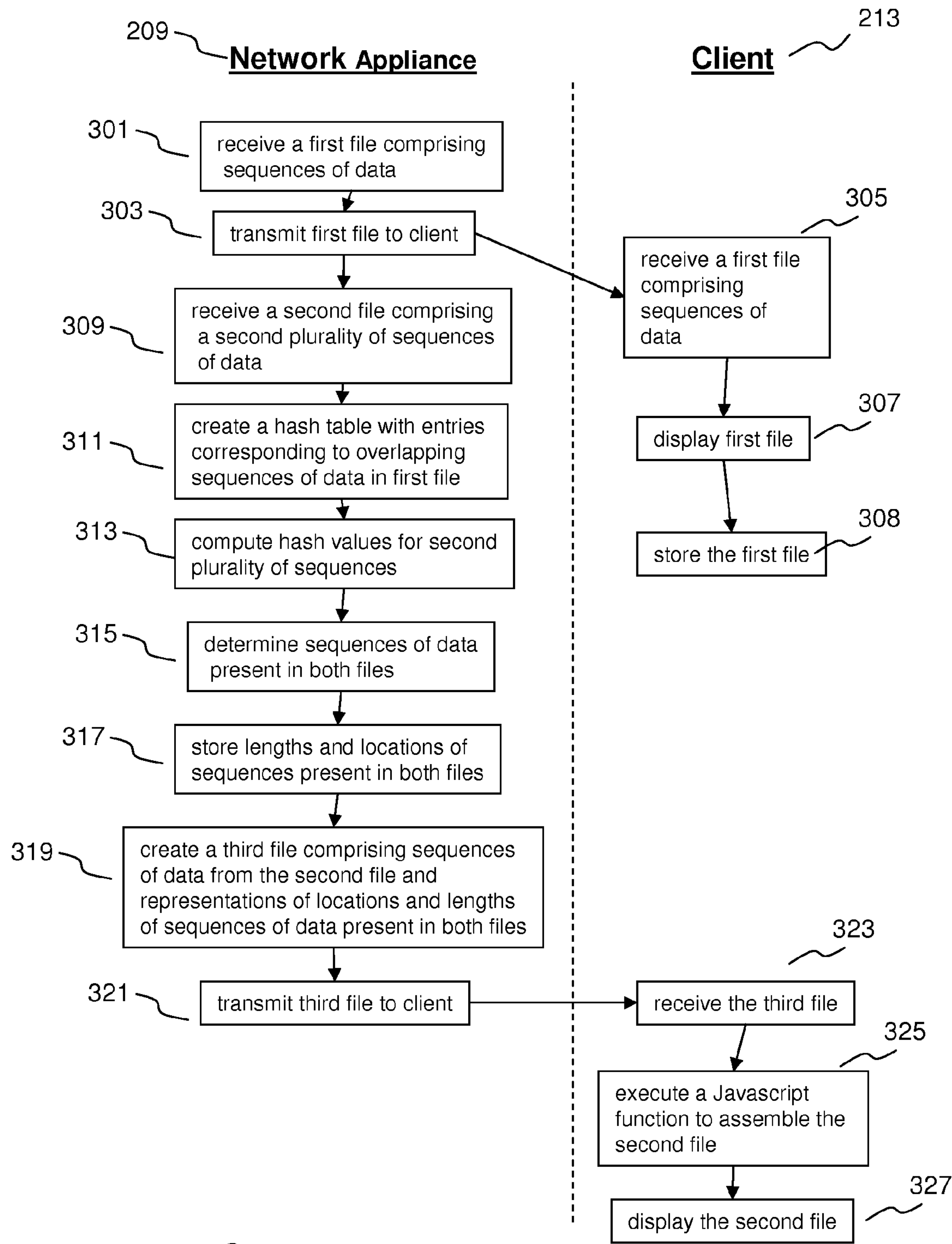
FIG. 3 is a flow diagram depicting one embodiment of a method for creating an efficient update to a previously stored file.

Referring now to FIG. 3, one embodiment of a method for creating an efficient update to a previously stored file is shown. Although FIG. 3 depicts the method in the context of being performed by a network appliance 209 and a client 213, the method may be performed by any of the computing devices discussed herein either alone or in any combination. In brief overview, the method comprises: receiving a first file comprising a first plurality of sequences of data (step 301); transmitting the first file to a client (step 303); receiving a second file comprising a second plurality of sequences of data (step 309); creating a hash table having a plurality of entries, each of the plurality of entries corresponding to a respective one of the first plurality of sequences, and wherein at least two of said entries correspond to overlapping sequences of data (step 311); computing hash values for said second plurality of sequences of data (step 313); comparing each of the second plurality of sequences of data with sequences from the first plurality of sequences having the same hash value to determine sequences of data present in both files (step 315); storing representations of lengths and locations of said sequences of data present in both the first and second files (step 317); creating a third file comprising sequences of data from the second file and representations of locations and lengths of said sequences of data present in both the first and second files (step 319); and transmitting the third file to a client (step 321).

Still referring to FIG. 3, and now in greater detail, the network appliance 209 receives a first file comprising a first plurality of sequences of data (step 301). In some embodiments the first file may be received from a network 211', from a server 205, from a database, or from any combination thereof. In some embodiments the first file may be read from a disk or other storage medium, retrieved from a cache, or accessed from RAM. In other embodiments the first file may be received from an application or process executing on the network appliance 209.

The first file may comprise sequences of data corresponding to sequences of bits or bytes comprising the file. The first file may comprise any file protocol, including without limitation, HTML, XML, WML, SVG, other document protocols, image file protocols, sound file protocols, video file protocols, and binary file protocols. In some embodiments the file comprises a web page or a portion of a web page. In some embodiments the file comprises any web page that is updated with some frequency, including without limitation a news page, a web application page, a chat room, a bulletin board, a sports page, an e-mail page, a directory listing, a tracking page, and a webcam page. After receiving the first file, the network appliance 209 may store or cache the first file to permit later retrieval. In some embodiments the network appliance 209 may modify said first file in accordance with any of the network appliance functions described herein.

In some embodiments, after receiving the first file (step 301), the network appliance 209 transmits the first file to a client (step 303). The network appliance 209 may transmit the first file via any of the networks, or protocols described herein, and to any of the clients described herein. The network appliance 209 may modify the first file in accordance with any of the functions performed by the network appliance, including compression, acceleration and encryption. Although FIG. 3 depicts the network appliance 209 transmitting the first file immediately after step 301, in other embodiments said transmittal could occur after any of the steps (steps 305-321) occurring after the network appliance 209 receives the first file (step 301).

In some embodiments, the network appliance 209 may store a record of said transmission. Said record may be stored in any memory element, including a data base or cache. In one embodiment, the network appliance 209 may access said cache to determine whether a given file has been previously transmitted to a client. In one embodiment, said records may be set to expire after a set amount of time. For example, if a network appliance 209 has information indicating that a given client 213 deletes all files from its cache at the end of each day, the network appliance may set all records of files transmitted to the client 213 to expire at the end of each day.

In the embodiment shown, after the network appliance 209 transmits the first file to the client 213 (step 303), the client may then receive the first file (step 305), display the first file (step 307), and store the first file (step 308). The client may perform these steps in accordance with any of the embodiments described herein.

In the embodiment shown, after the network appliance 209 transmits the first file to the client 213 (step 303), the network appliance receives a second file comprising a second plurality of sequences of data (step 309). In other embodiments, the network appliance 209 may receive the second file (step 309) before or during the transmission of the first file to the client (step 303). The second file may comprise any of the file types, protocols, web pages and portions of web pages discussed herein. After receiving the second file, the network appliance 209 may store or cache the second file to permit later retrieval. In some embodiments the network appliance 209 may modify said second file in accordance with any of the network appliance functions described herein.

After receiving the second file comprising a second plurality of sequences of data (step 309), the network appliance may create a hash table having a plurality of entries, each of the plurality of entries corresponding to a respective one of the first plurality of sequences, and wherein at least two of said entries correspond to overlapping sequences of data (step 311). Said hash table may be created according to any known hash table algorithm which provides functionality to store sequences of data or references to sequences of data as entries and then efficiently search said table for entries matching a given sequence. In other embodiments, the network appliance may create the hash table (step 311) before or during receiving the second file (step 309).

In some embodiments, the entries in the hash table may correspond to sequences of data from the first file comprising sequences of bytes. The sequences of bytes may be of any length. In one embodiment the sequences are four-byte sequences.

In the embodiment shown, at least two of the hash table entries correspond to overlapping sequences of data. Overlapping sequences may have any number of bytes in common. For example if the file comprised the sequence "abcdefghijklmnop", examples of overlapping four-byte sequences include "cdef" and "defg" in addition to "cdef" and fghi." In one embodiment, the hash table entries correspond to successive overlapping byte sequences. For example, if the file comprised the sequence "abcdefg", a hash table comprising at least two successive overlapping four-byte sequences may include entries corresponding to the sequences "abed" "bcde" "cdef" and "defg".

In some embodiments, the hash table entries at a given time may only correspond to sequences of data from a given portion or "window" of the first file. This allows the size of the hash table to be smaller than the hash table might be if the entire file was hashed at once. In some embodiments, only the first X bytes of the first file are hashed, and then, upon occurrence of some conditions, Y entries are removed from the table followed by Y more entries being added to the table. In one embodiment a window size of 64 kilobytes is used, and upon occurrence of certain conditions, the window is moved by 32 kilobytes. In this embodiment, the sequences from the first 64 kilobytes of the first file are hashed, and then upon occurrence of certain conditions, the entries corresponding sequences from the first 32 kilobytes of the file are removed, and entries corresponding to sequences from the next 32 kilobytes of the file are added.

The conditions upon which the hash window are moved may be any conditions which improve the execution time, performance, or compression of the hashing algorithm. In one embodiment, the window is moved when matches have been found for more than 85% of the sequences in a given half of the window. In another embodiment, the window is moved when a given percentage of the second file has been compared with the existing hash entries. In one embodiment, the window is moved when hash values have been computed and compared for a proportionate portion of the second file compared to the first file. For example, if the first file is 100 kilobytes, and the second file is 80 kilobytes, the hash window may be moved when 80/100*64 kilobytes of the second file has been compared to sequences in the hash table.

After the network appliance 209 creates a hash table (step 311), the network appliance 209 may then compute hash values for said second plurality of sequences of data (step 313). Said hash values may be computed according to the same method used to compute hash values for the first plurality of sequences. The network appliance 209 may choose sequences of data from the second file in the same manner in which the network appliance chose sequences of data from the first file. For example, if the network appliance 209 created hash table entries corresponding to successive overlapping four-byte sequences from the first file, the network appliance may choose to compute hash values for successive overlapping four-byte sequences from the second file.

After computing hash values for some or all of the second plurality of sequences of data (step 313) the network appliance 209 may compare each of the second plurality of sequences of data with sequences from the first plurality of sequences having the same hash value to determine sequences of data present in both files (step 315). The network appliance may perform this step in accordance with any hashing algorithm presently available. Said comparisons may comprise a comparison of subsequent bytes of matched sequences to determine longer matches. For example, the first file may comprise the sequence "abcdefghijklmno" and the second file may comprise the sequence "zyxwvutcdefghituv." If the hashing is done on successive four-byte sequences, the network appliance 209 may determine that the sequence "cdef" is present in both files. The network appliance 209 may then compare subsequent bytes of the matched sequences to determine that the sequence "cdefghi" is present in both files. Thus in some embodiments the lengths of the sequences determined to be present in both files may vary from the lengths of the sequences for which hash values are computed. In some embodiments a minimum and maximum length on matching sequences may be set.

After determining sequences of data present in both files (step 315) the network appliance 209 may store representations of lengths and locations of said sequences of data present in both the first and second files (step 317). The network appliance 209 may store said representations in any storage medium, including a cache, RAM, a disk, or tape. In some embodiments, the network appliance 209 may store said representations on the network appliance 209 itself. In other embodiments, the network appliance 209 may store said representations on another computing device 100. In some embodiments, lengths and locations of a sequences of data may be stored while the network appliance 209 is comparing each of the second plurality of sequences of data with sequences from the first plurality of sequences having the same hash value (step 313). In other embodiments a minimum length may be required for the length and location of a given sequence to be stored. In one embodiment, the minimum length may be specified to be four bytes.

The representations of lengths and locations of said sequences present in both files may comprise any representation which identifies a length and location of a sequence. In some embodiments the locations of said sequences are stored as absolute locations within a file. In other embodiments, the locations of said sequences are stored as locations relative to a given reference pointer within said first file. In one embodiment, said reference pointer may be fixed, in another embodiment said reference pointer may move according to a rule set.

In one embodiment the reference pointer may be initially set to point to the beginning of the first file. The pointer may then be incremented every time a matching sequence of longer than 5 bytes is found. The pointer may then be incremented to point to the last byte plus one of the matching sequence in the first file. In this embodiment, locations of said sequences present in both files are stored as a given number bytes, positive or negative, from the position of the reference pointer.

In some embodiments, the lengths and locations of the matched sequences are stored as fixed length integers. In one embodiment, the length of a matched sequence is stored as a 1 byte integer, wherein the integer represents a length of between 4 to 1027 bytes. In this embodiment, byte-lengths of matched sequences are restricted to multiples of 4. In other embodiments, any other bit or byte length integers may be used to store said sequence lengths. In still other embodiments, any other restrictions may be imposed on byte-lengths of matched sequences, including minimum and maximum lengths, and limiting byte lengths to given multiples. In still other embodiments, lengths of matched sequences may be stored as variable length integers. In some embodiments locations of matched sequences may be stored as variable length integers. In other embodiments, locations of matched sequences are stored as fixed length integers of a given byte or bit length.

After the network appliance 209 stores representations of lengths and locations of said sequences of data present in both the first and second files (step 317), the network appliance 209 may create a third file comprising sequences of data from the second file and representations of locations and lengths of said sequences of data present in both the first and second files. Said creation (step 317) may occur after all the lengths and locations of matched sequences are stored, or said creation (317) may occur contemporaneously as matched sequences are found. The third file may contain representations of lengths and locations in any format discussed herein. In some embodiments lengths and locations of shared sequences may be preceded by special byte or bit sequences.

For example, if a first file comprised the string "abcdefghijklmnop," and the second file comprised the string "xxxxxxxdefghijkxxxxxxxcdefxxx", the third file may comprise the sequence "xxxxxxx3,8xxxxxx2,4xxx". In this example 3,8 is used to indicate a representation indicating the sequence from the first file starting at byte 3 and 8 bytes long (in some embodiments this representation could be two fixed-length binary integers). Likewise 2,4 indicates that a representation indicating the sequence from the first file starting at byte 2 and 4 bytes long.

As another example, if the first file comprised the string "abcdefghijklmnop," and the second file comprised the string "xxxxxxxdefghijkxxxxxxxcdefxxx", the third file may comprise the sequence "xxxxxxx3,8xxxxxx-9,4xxx". In this example, locations of shared sequences are stored as relative distances from a reference pointer, incremented according to the method described above. In this example, the network appliance 209 indicates the first matched sequence in the same manner as the previous example, since the reference pointer initially points to the beginning of the first file. The reference pointer would then be incremented to point to location of the last byte plus one of the matching sequence in the first file. Thus, the second matched sequence is indicated with −9,4 which indicates that the second matched sequence occurs nine bytes prior to the byte following the previous matched sequence in the first file.

In one embodiment, the third file may be encoded in a byte protocol, such as ASCII. In one embodiment, each group of 7 bytes of binary data may be encoded as 8 bytes of ASCII characters. This conversion may be done by any known conversion method. The ASCII characters may correspond to any existing character set definition, including 150-8859-1. In some embodiments, the third file may comprise an HTML file. In one embodiment, the third file may comprise a Javascript variable comprising said sequences of data from the second file and representations of locations and lengths of said sequences of data present in both the first and second files. In one embodiment, the third file may also comprise a Javascript function comprising functionality for assembling said second file by processing said Javascript variable. In another embodiment the third file may contain a reference to a Javascript function comprising said functionality.

The following HTML code illustrates one example of a third file that may be transmitted to a client.

```
<HTML>
  <HEAD>
    <SCRIPT>
      var updateFile = "~~~~~ "
    <SCRIPT>
  </HEAD>
  <BODY onload=createPage( updateFile )>
  </BODY>
</HTML>
```

In the above example, an HTML file comprises a Javascript variable named "updateFile." Said variable may comprise sequences of data from the second file and representations of locations and lengths of said sequences of data present in both the first and second files. The example above also comprises a call to a Javascript function named "createPage." Said function, which may either be included with the HTML file or stored on the client, may comprise functionality for assembling said second file using the data from the Javascript variable "updateFile." In the example above, a standard HTML browser would execute the "createPage" function upon loading the HTML page. The "createPage" function may also comprise functionality for altering the HTML page to display said second file once the second file is assembled.

After creating a third file comprising sequences of data from the second file and representations of locations and lengths of said sequences of data present in both the first and second files (step 319); and the network appliance 209 may transmit the third file to a client (step 321). Said transmission may occur via any of the networks and methods discussed herein. The network appliance 209 may modify the third file in accordance with any function performed by the network appliance 209 including compression, acceleration and encryption.

After transmitting the third file to a client (step 321), the client 213 may receive the third file (step 323); execute a Javascript function to recreate the second file comprising sequences of data from the second file and sequences in the first file indicated by the third file (step 325); and display the second file (step 327). The client 213 may perform these steps in accordance with any of the embodiments described herein.

Figure 4:
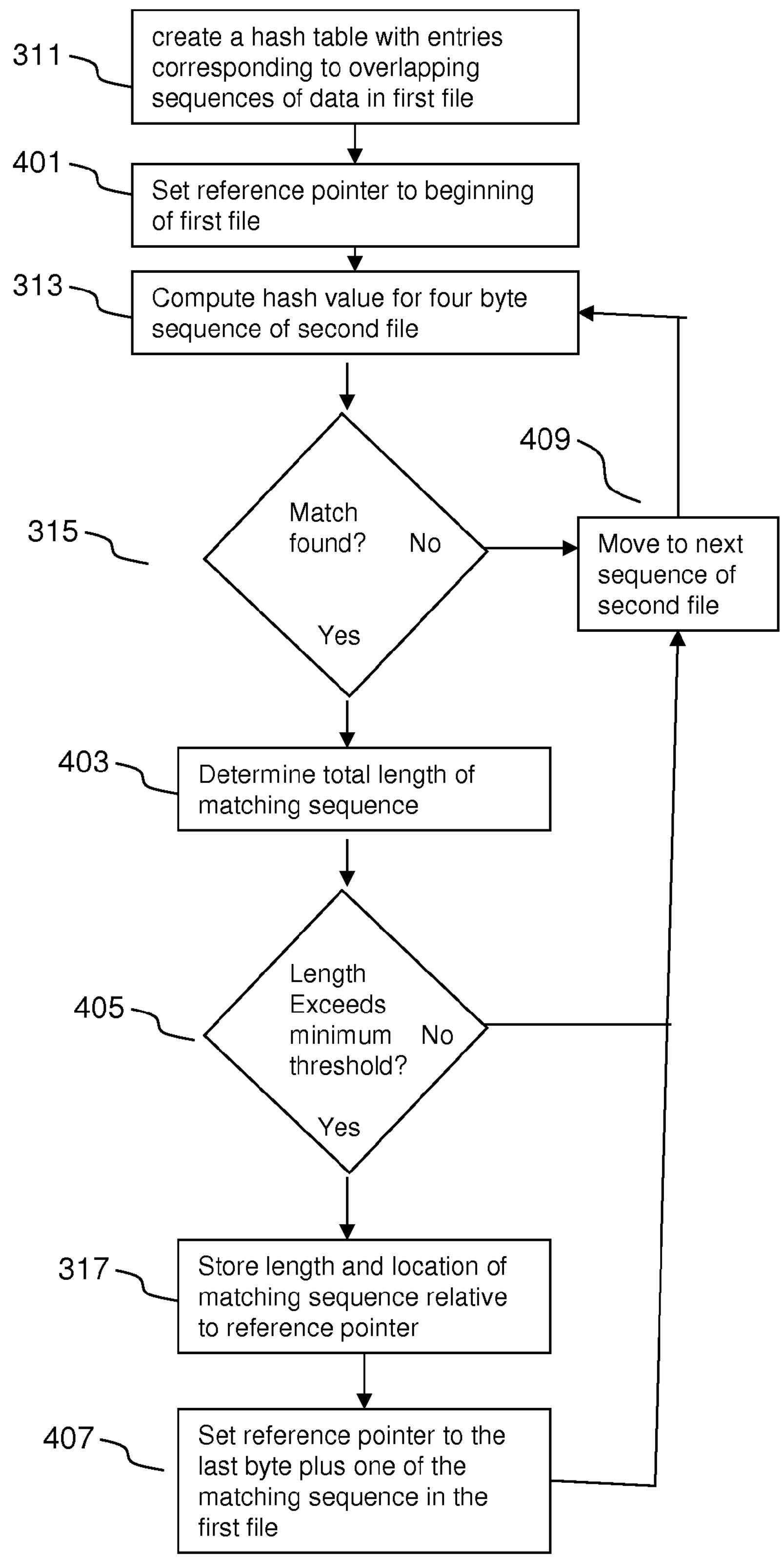
FIG. 4 is a flow diagram depicting another embodiment of a method for creating efficient updates to a previously stored file.

Referring now to FIG. 4, a flow diagram depicting another embodiment of a method for creating efficient updates to a previously stored file is shown. In brief overview, the method comprises creating a hash table with entries corresponding to overlapping sequences of data in a first file (step 311); setting a reference pointer to the beginning of said first file (step 401); computing a hash value for a sequence of data in a second file (step 313); and determining whether said sequence is present in both files (step 315). The method may then comprise either moving to the next sequence in the second file (step 409) or determining a total length for the matching sequence (step 403) and determining whether said length exceeds a minimum threshold (step 405). The method may then comprise either moving to the next sequence in the second file (step 409) or storing the length and location of the matching sequence relative to reference pointer (step 317). The method may then comprise setting the reference pointer to the last byte plus one of the matching sequence in the first file (step 407) and then moving to the next sequence in the second file (step 409). In the embodiment shown, the method may be performed by a network appliance 209.

Still referring to FIG. 4, now in greater detail, a network appliance 209 creates a hash table with entries corresponding to overlapping sequences of data in a first file (step 311). This step may be performed in accordance with any of the methods for creating a hash table described herein.

After creating a hash table with entries corresponding to overlapping sequences of data in a first file (step 311) the network appliance 209 may set a reference pointer to the beginning of said first file (step 401). The reference pointer may comprise any type of pointer.

After setting a reference pointer to the beginning of said first file (step 401), the network appliance 209 may compute a hash value for a sequence of data in a second file (step 313). This step may be performed in accordance with any of the methods for computing a hash value described herein.

After computing a hash value for a sequence of data in a second file (step 313), the network appliance 209 may determine whether said sequence is present in both files (step 315). This step may be performed in accordance with any of the methods described herein.

If a sequence is not present in both files, the network appliance 209 may move to the next sequence of the second file (409). Said next sequence may comprise any sequence occurring after the given sequence in the second file. In one embodiment, the next sequence may be the sequence starting one byte after the previous sequence. In another embodiment, the next sequence may be the sequence starting any other number of bytes after the previous sequence. In some embodiments moving to the next sequence of the second file (step 409) may be accompanied by moving a hash window as described previously herein. If no next sequence exists, the method may terminate.

If a sequence is present in both files, the network appliance 209 may determine a total length of a matching sequence by comparing subsequent bytes of the matched sequences (step 403). The total length may be determined in accordance with any of the methods described herein.

The network appliance 209 may then determine if the total length of the matching sequence exceeds a given threshold (step 405). This determination may be made in accordance with any of the methods described herein. If the length of the matching sequence does not exceed the minimum threshold, the network appliance 209 may move to the next sequence of the second file.

If the length does exceed the minimum threshold, the network appliance 209 may then store the length and location of the matching sequence relative to the given reference pointer in accordance with any of the methods discussed herein. The network appliance 209 may then increment the reference pointer according to any of the methods described herein (step 407). The network appliance 209 may then move to the next sequence of the second file (step 409).

Figure 5:
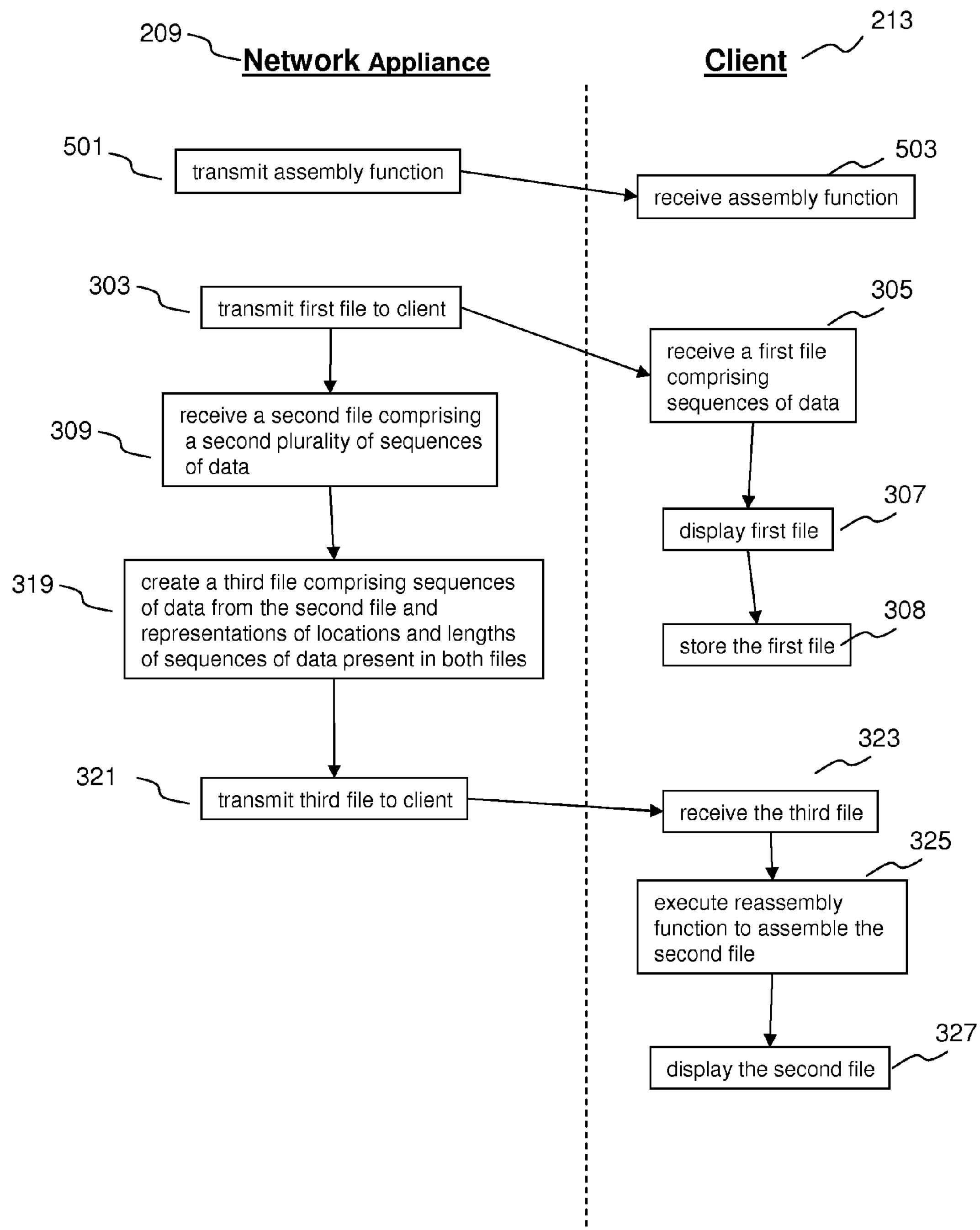
FIG. 5 is a flow diagram depicting another embodiment of methods for creating and receiving efficient updates to a previously stored file.

Now referring to FIG. 5, one embodiment of a method for efficiently receiving updates to previously stored files is depicted. In brief overview, said method comprises: receiving a assembly function (step 503), receiving a first file comprising sequences of data (step 305); displaying said first file; storing said first file (step 308); receiving a third file comprising sequences of data and representations of locations and lengths of sequences in the first file (step 323); executing a Javascript function to create a second file comprising sequences of data from the second file and sequences in the first file indicated by the third file (step 325); and displaying said second file (step 327).

Still referring to FIG. 5, now in greater detail, a network appliance 209 may transmit a assembly function. Said assembly function may comprise any computer readable program means for assembling a second file using a file comprising sequences of data from a second file and representations of locations and lengths of said sequences of data present in both a first and second files. Said assembly function may comprise any programming or scripting language, including Javascript, or Java. In some embodiments, the assembly function may be transmitted in accordance with any of the other network appliance functions described herein. In one embodiment, the assembly function may be included in a program providing other client-side acceleration functionality.

In the embodiment shown, after the network appliance 209 transmits a assembly function (step 501), a client 213 receives the assembly function (step 503). The client may receive said assembly function via any of the networks, protocols, or computing devices described herein. In some embodiments, the client 213 receives the assembly function from a network appliance 209. In one embodiment, the assembly function may be included as part of a client-side acceleration program. In other embodiments, the assembly function may be installed on the client 213 via any means of transferring software, including via a disk or other portable storage device.

In the embodiment shown, after receiving a assembly function (step 503), the client 213 receives a first file comprising sequences of data. In the embodiment shown, the client 213 receives the first file from a network appliance 209. In other embodiments, the client 213 may receive the first file from any computing device. Said file may comprise any file type or protocol discussed herein.

After a client 213 receives a first file comprising sequences of data (step 305), the client 213 may display said first file (step 307). The file may be displayed in any manner appropriate for the given file. In some embodiments, the file may be displayed in a web browser. In other embodiments, the file may be displayed in a business application, such as a word processor or a spreadsheet. In still other embodiments the file may comprise a standalone application and be displayed as such. In some embodiments, the file may correspond to an application running in a virtual computing environment. In one embodiment, the file may correspond to a remotely executing application. In another embodiment, the file may correspond to a streaming application.

After a client 213 displays said first file (step 307), the client 213 may store said first file (step 308). The client 213 may store the first file in any storage element, including storing in a cache, disk, flash memory, or RAM. In some embodiments, the client 213 may compress the file for storage. In other embodiments the client 213 may store only portions of the file. In some embodiments the client 213 may store said first file (step 308) before or during the display of said first file (step 307).

After a client 213 stores said first file (step 308), the client 213 may receive a third file (step 323). In the embodiment shown, the client 213 receives the third file from a network appliance 209. In other embodiments, the client 213 may receive the third file from any computing device. Said file may comprise any file type or protocol discussed herein. In some embodiments, the file may comprise ASCII characters. In other embodiments, the file may comprise binary data.

After a client 213 receives said third file (step 323), the client may execute a Javascript function to assemble a second file (step 325). In some embodiments, the Javascript function may be included in said third file. In other embodiments, the Javascript function may be already stored on the client 213. In some embodiments, the Javascript function may be provided in a client-side acceleration program. In some embodiments, the third file may comprise a link to a location where the client 213 may download the Javascript function.

The Javascript function may perform any technique, or the reverse of any technique described herein to assemble said second file. In some embodiments, the Javascript function may comprise the assembly function received in step 503. In other embodiments, the Javascript function may comprise a reference to said assembly function. In still other embodiments, said Javascript function may comprise means for downloading said assembly function.

After executing a Javascript function to assemble said second file (step 325), the client may display said second file (step 327). The file may be displayed in accordance with any of the methods described herein for displaying a file.

Figure 6:
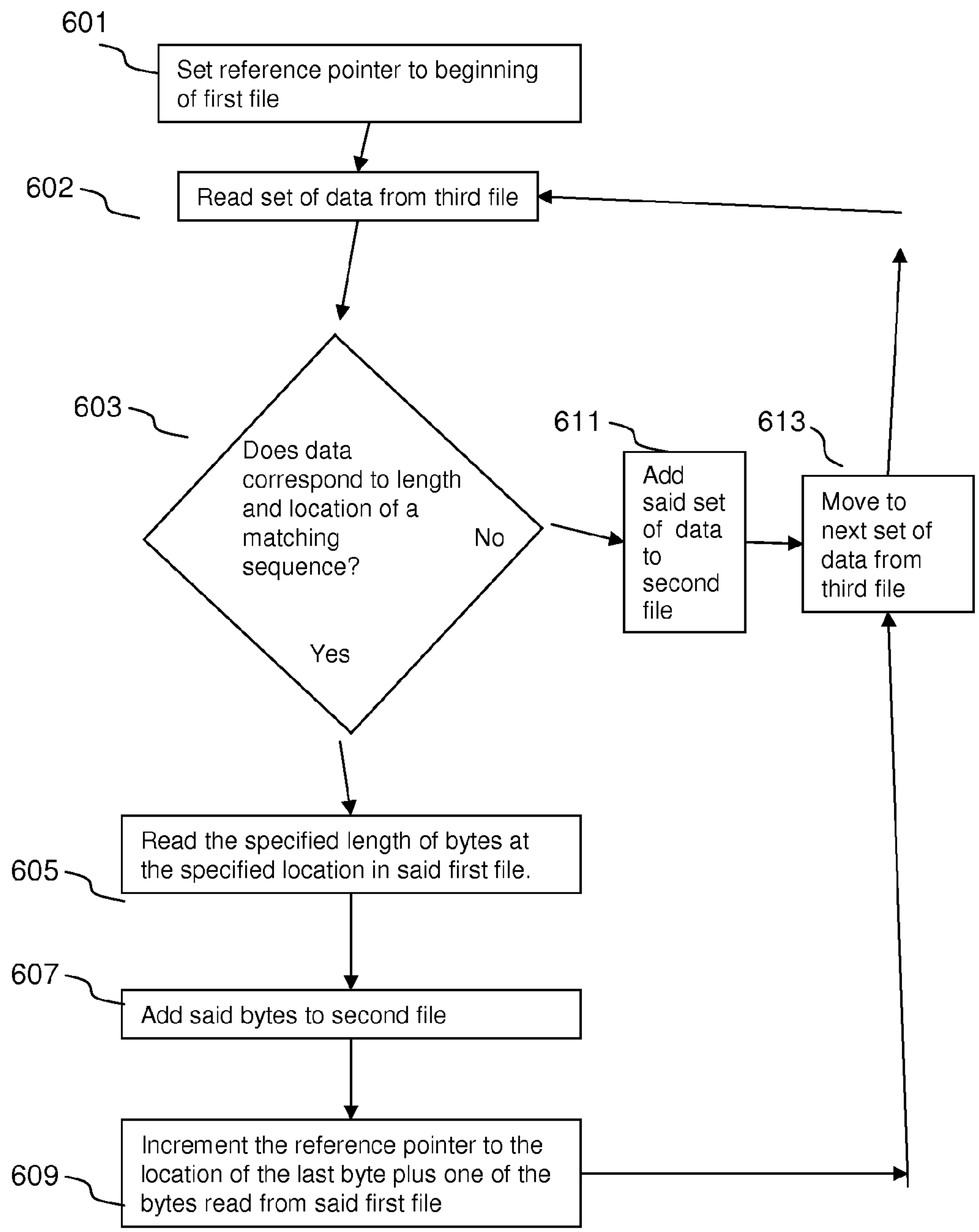
FIG. 6 is a flow diagram depicting one embodiment of a method for assembling a second file from a previously stored first file and a third file comprising sequences of data from the second file and representations of locations and lengths of sequences of data present in both the first and second files.

Referring now to FIG. 6, one embodiment of a method for assembling a second file from a previously stored first file and a third file comprising sequences of data from the second file and representations of locations and lengths of sequences of data present in both a first and second files is shown. In brief overview, the method comprises reading a set of data from a third file (step 601) and determining whether said set of data corresponds to a locations and length of said sequences of data present in both the first and second files (step 603). The method then may comprise reading the specified length of bytes at the specified location in said first file (step 605); adding said bytes to the second file (step 607); incrementing the reference pointer to the location of the last byte plus one of the bytes read from the first file (step 609); and moving to the next set of data from said third file (step 613). In one embodiment, said method may be performed by a client 213. In another embodiment, said method may be performed by a assembly function as described in FIG. 5.

Still referring to FIG. 6, now in greater detail, a client 213 may set a reference pointer to the beginning of the first file. This may be performed in accordance with any of the methods described herein.

After setting the reference pointer (step 601) a client 213 may read a set of data from a third file (step 602). Said set of data may comprise any number of bits or bytes of said third file. In one embodiment, said set of data is then stored in a memory element or cache.

After reading said set of data (step 602), a client 213 may determine whether said set of data corresponds to a length and location of a sequence in the first file. In one embodiment, a client may determine whether said set of data comprises a special character or bit sequence.

If said set of data does not correspond to a length and location of a sequence in the first file, the client 213 may add said set of data to the second file (step 611). Said addition may comprise appending said set of data to the end of the second file. The client 213 may then move to the next set of data from the third file (step 613).

If said data does correspond to a length and location of a sequence in the first file, the client 213 may then read the specified length of bytes at the specified location in the first file (step 605). The client may determine the length and location specified by recognizing any of the representations of lengths and locations described herein. In one embodiment, the client may then store said specified bytes in a memory element or cache.

After reading the specified length of bytes at the specified location in the first file (step 605), the client 213 may then add said bytes to the second file (step 607). Said addition may comprise appending said bytes to the end of the second file.

The client 213 may then increment the reference pointer to the location of the last byte plus one of the bytes read from said first file (step 609). This may be performed in accordance with any of the methods described herein. The client 213 may then move to the next set of data from said third file. (step 613).

Figure 7:
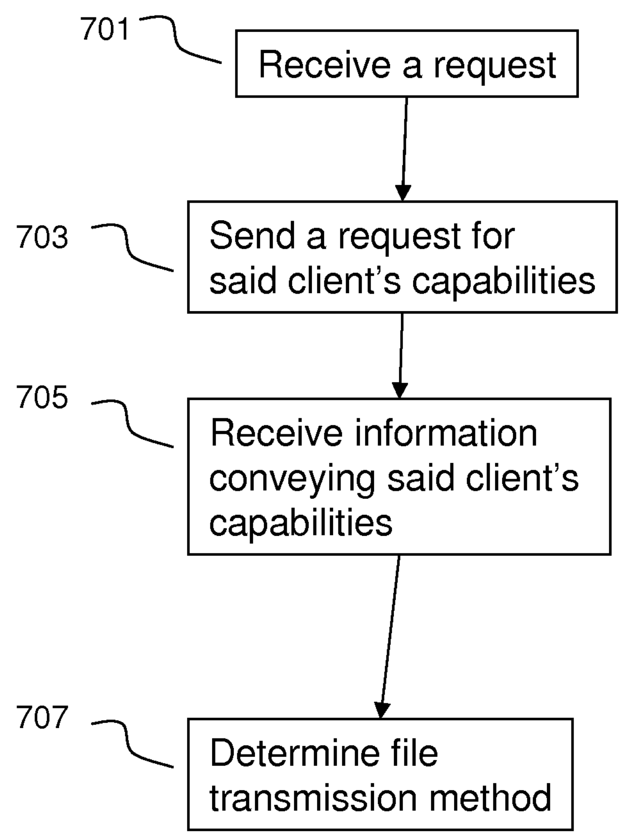
FIG. 7 is a flow diagram depicting one embodiment of a method for determining a file transmission method.

Referring now to FIG. 7, one embodiment of a method for determining a file transmission method is shown. Said method may be performed by any of the machines or combinations of machines described above, although the embodiment below describes the method being performed by a network appliance 209. In brief overview, the method comprises receiving a request from a client 213 for a resource (step 701); sending a request for said client's capabilities (step 703); receiving information conveying said client's capabilities (step 705); and determining a file transmission method (step (707).

Still referring to FIG. 7, now in greater detail, the network appliance 209 receives a request from a client (step 701). In one embodiment receiving a request from a client (step 701) comprises receiving a request directly from a client. In other embodiments, the request from a client 213 may be received from any of the networks, connections, and appliances previously discussed. Said request may comprise any of the protocols previously discussed. In some embodiments the request may comprise the request exactly as transmitted from the client 213. In other embodiments the request may comprise a modification of an original request from a client 213. Said modifications may comprise modifications in the course of providing any of the network appliance services discussed above, and any other modifications to the content, format, protocol, addressing, headers, or other portions of the request. request from a client 213, or a new request. A request may comprise a resource directly requested by a client 213, and it may comprise a resource requested in the course of performing any service for the client 213.

After receiving a request from a client (step 701), the network appliance 209 sends a request for said client's capabilities (step 703). In one embodiment, said request may be sent to the client 213. In another embodiment, request may be sent to a collection agent as described in U.S. patent application Ser. No. 10/956,832 "A METHOD AND APPARATUS FOR ASSIGNING ACCESS CONTROL LEVELS IN PROVIDING ACCESS TO NETWORKED CONTENT FILES" whose contents are expressly incorporated herein by reference. Said collection agent may reside on the same physical machine as the network appliance sending the request, or they may reside on different physical machines. Said request may also be sent to a file, a cache, a database, a server, an executing application, or any other source of information concerning the client 213.

After sending a request for the client's capabilities (step 703) the network appliance 209 receives information conveying said clients capabilities (step 705). Said information may be received from a client 213, a collection agent, a file, a cache, a database, a server, an executing application, or any other source of information concerning the client 213. Said information may comprise, without limitation machine ID of a client node 213, operating system type, existence of a patch to an operating system, MAC addresses of installed network cards, a digital watermark on the client device, membership in an Active Directory, existence of a virus scanner, existence of a personal firewall, an HTTP header, browser type, device type, network connection information, authorization credentials, and any of the other capabilities or preferences discussed above. In some embodiments, the network appliance may store or cache said information for later retrieval.

After receiving information conveying said clients capabilities (step 705); the network appliance may determine a file transmission method corresponding to said client 213 (step 707). Said determination may be made on the basis of any of the information received.

In some embodiments, the network appliance 209 may determine, in response to information received in step 705, to transmit files in accordance with the method for creating efficient updates to a previously stored file described in FIG. 3. In one embodiment, said determination may be made in response to information corresponding to the client's 213 memory size, connection speed, connection bandwidth, processor speed, or the prior existence of a stored file.

In some embodiments, the network appliance 209 may determine, in response to information received in step 705, to transmit a assembly function to the client 213. For example, the network appliance may transmit a assembly function to a client 213 if the network appliance 209 receives information that the client 213 does not possess the assembly function, and the information indicates the client has the capability to execute a assembly function. In some embodiments, said assembly function may be transmitted along with any other files, including requested content files, or other files transmitted in accordance with the functions of the network appliance 209. In some embodiments, a network appliance may possess a plurality of assembly functions. For example, a network appliance 209 may possess a number of assembly functions optimized for different computing environments, operating systems, and hardware configurations. The network appliance may then determine, in response to the information received in step 705, which assembly function to transmit to a client 213.

While the invention has been particularly shown and described with reference to specific preferred embodiments, it should be understood by those skilled in the art that various changes in form and detail may be made therein departing from the spirit and scope of the invention as defined by the appended claims.

We claim:

1. A method comprising:

(a) receiving, by a device having a first file comprising a first plurality of sequences of data, a second file comprising a second plurality of sequences of data, the device creating a hash table comprising entries corresponding to successive, overlapping byte sequences within the first file;

(b) comparing, by the device, hashes for each of the first plurality of sequences of data with hashes for each of the second plurality of sequences of data to identify a first sequence of data and a second sequence of data present in both the first plurality of sequences of data of the first file and the second plurality of sequences of data of the second file; and (c) establishing, by the device, a third file comprising one or more sequences of data from the second file, a representation of a location identifying a number of bytes in the third file between a predetermined byte of representation of the first sequence of data represented in the third file and a predetermined byte of representation of a second sequence of data represented in the third file, and a representation of a length identifying a number of bytes of the first sequence of data bytes matching the second sequence of data bytes.

2. The method of claim 1, wherein step (b) further comprises:

(i) computing a hash value for a given sequence of data in the second file;

(ii) checking a hash table of the first file for an entry corresponding to the hash value;

(iii) comparing the sequence of data from the second file with a sequence of data in the first file corresponding to said hash table entry; and (iv) comparing the bytes following the sequence of data from the second file with the bytes following the sequence of data in the first file to determine a length of the first sequence of data present in both the first file and the second file.

3. The method of claim 1, wherein step (c) further comprising representing, by the device, the location as a relative distance from a location in the first file.

4. The method of claim 1, wherein step (c) further comprises translating, by the device, the third file into a byte sequence using a byte encoding protocol.

5. The method of claim 1, wherein step (c) further comprises executing, by the device, a script to create the third file.

6. The method of claim 1, wherein step (c) further comprises establishing, by the device, the representation of the location identifying the number of bytes between a last byte of the first sequence of data and the predetermined byte of the second sequence of data.

7. The method of claim 1, wherein step (c) further comprises establishing, by the device, the representation of the location identifying the number of bytes between the predetermined byte of the first sequence of data and a byte preceding the first byte of the second sequence of data.

8. The method of claim 1, wherein step (c) further comprises establishing, by the device, the representation of the location identifying a number of bytes between the last byte of the first sequence of data and a byte preceding the first byte of the second sequence of data.

9. A system comprising:

a device storing a first file comprising a first plurality of sequences of data, the device creating a hash table comprising entries corresponding to successive, overlapping byte sequences within the first file;

a transceiver of the device receiving a second file comprising a second plurality of sequences of data;

an engine of the device comparing hashes for each of the first plurality of sequences of data with hashes for each of the second plurality of sequences of data to identify a first sequence of data and a second sequence of data present in both the first plurality of sequences of data of the first file and the second plurality of sequences of data of the second file; and wherein the device establishes a third file comprising one or more sequences of data from the second file, a representation of a location identifying a number of bytes in the third file between a predetermined byte of representation of the first sequence of data represented in the third file and a predetermined byte of representation of a second sequence of data represented in the third file, and a representation of a length identifying a number of bytes of the first sequence of data bytes matching the second sequence of data bytes.

10. The system of claim 9, wherein the engine of the device performs the following:

(i) computing a hash value for a given sequence of data in the second file;

(ii) checking a hash table of the first file for an entry corresponding to the hash value;

(iii) comparing the sequence of data from the second file with a sequence of data in the first file corresponding to said hash table entry; and (iv) comparing the bytes following the sequence of data from the second file with the bytes following the sequence of data in the first file to determine a length of the first sequence of data present in both the first file and the second file.

11. The system of claim 9, wherein the engine creates the representation of the location as a relative distance from a location in the first file.

12. The system of claim 9, wherein the engine establishes the representation of the location identifying the number of bytes between the last byte of the first sequence of data and the predetermined byte of the second sequence of data.

13. The system of claim 9, wherein the engine establishes the representation of the location identifying the number of bytes between the predetermined byte of the first sequence of data and a byte preceding the first byte of the second sequence of data.

14. The system of claim 9, wherein the engine establishes the representation of the location identifying the number of bytes between the last byte of the first sequence of data and a byte preceding the first byte of the second sequence of data.

15. A system comprising:

a device intermediary to a client and a server, the device storing a first file communicated between the server and the client, the first file comprising a first plurality of sequences of data, the device creating a hash table comprising entries corresponding to successive, overlapping byte sequences within the first file;

a transceiver of the device receiving a second file communicated between the server and the client, the second file comprising a second plurality of sequences of data;

an engine of the device comparing hashes for each of the first plurality of sequences of data with hashes for each of the second plurality of sequences of data to identify a first sequence of data and a second sequence of data present in both the first plurality of sequences of data of the first file and the second plurality of sequences of data of the second file; and wherein the device establishes a third file comprising one or more sequences of data from the second file, a representation of a location identifying a number of bytes in the third file between a predetermined byte of representation of the first sequence of data represented in the third file and a predetermined byte of representation of a second sequence of data represented in the third file, and a representation of a length identifying a number of bytes of the first sequence of data bytes matching the second sequence of data bytes.

16. The system of claim 15, wherein the device transmits the third file to the client.

* * * * *